US011269689B2

(12) United States Patent
Gellai, Sr. et al.

(10) Patent No.: US 11,269,689 B2
(45) Date of Patent: Mar. 8, 2022

(54) DISTRIBUTION OF COMPONENTS OF DISPLAYED DATA BETWEEN A SERVER AND A CLIENT BASED ON SERVER AND CLIENT LOAD FACTORS

(71) Applicant: INTERNATIONAL BUSINESS MACHINES CORPORATION, Armonk, NY (US)

(72) Inventors: Andrew Paul Gellai, Sr., Tucson, AZ (US); Terry Wade Niemeyer, Austin, TX (US); Mark Allen Sistrunk, Austin, TX (US); Jiandong Tang, Campbell, CA (US); Navin Manohar, Cedar Park, TX (US); Lori Christine Simcox, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 16/530,523

(22) Filed: Aug. 2, 2019

(65) Prior Publication Data

US 2021/0034434 A1 Feb. 4, 2021

(51) Int. Cl.
*G06F 9/50* (2006.01)
*H04L 29/06* (2006.01)
*H04L 67/01* (2022.01)

(52) U.S. Cl.
CPC ............ *G06F 9/5083* (2013.01); *G06F 9/505* (2013.01); *H04L 67/42* (2013.01)

(58) Field of Classification Search
CPC ...... G06F 9/5083; G06F 9/505; G06F 9/5033; H04L 67/42
See application file for complete search history.

(56) References Cited

U.S. PATENT DOCUMENTS

| 7,092,977 B2 | 8/2006 | Leung et al. |
| 7,454,446 B2 | 11/2008 | Leung et al. |
| 2010/0138475 A1* | 6/2010 | Frank .................... H04L 47/125 709/203 |

(Continued)

OTHER PUBLICATIONS

D. Peters, "System Design Strategies", Feb. 2003, Part 1, pp. 1-88.

(Continued)

*Primary Examiner* — Sisley N Kim
(74) *Attorney, Agent, or Firm* — Konrad Raynes Davda & Victor LLP; Rabindranath Dutta

(57) ABSTRACT

A determination is made of values for measures that affect processing of data in a computing environment comprising a client communicatively coupled to a server, wherein the measures include data factors, client factors, and server factors. A determination is made as to whether a load on the client is greater than the load on the server by calculating a load on the client and a load on the server based on the data factors, the client factors and the server factors, and then comparing the load on the client to the load on the server. In response to determining that the load on the client is greater than the load on the server, the data is stored at a location in the server, and an indication is made in a data structure in the client of a pointer to the location in the server.

21 Claims, 11 Drawing Sheets

(56) References Cited

U.S. PATENT DOCUMENTS

| | | | | |
|---|---|---|---|---|
| 2015/0134723 A1* | 5/2015 | Kansal | ............... | H04L 67/1031 |
| | | | | 709/203 |
| 2015/0215234 A1* | 7/2015 | Shanmuganathan | ....................... | |
| | | | | H04L 41/5025 |
| | | | | 709/226 |
| 2017/0109316 A1* | 4/2017 | Hack | .................... | G06F 15/167 |
| 2019/0306044 A1* | 10/2019 | Cohen | ................ | H04L 41/5009 |

OTHER PUBLICATIONS

"Identifying Sources of a Change in Metrics of a Stack of Servers", Anonymous, IIP.com, IP.com No. PCOM000252099D, Dec. 15, 2017, pp. 34.

"Dynamic Self adjusting Heuristics for Refreshing Client Display Information from Remote Data Collector", Anonymous, IP.com, IP.com No. IPCOM000203567D, Jan. 28, 2011, pp. 6.

"Automatically Scaling Multi-Tenant Machine Learning", Anonymous, IP.com, IP.com No. IPCOM000252098D, Dec. 15, 2017, pp. 35.

D. Peters, "System Design Strategies", Feb. 2003, Part 2, pp. 89-179.

\* cited by examiner

Example showing inputs, thresholds, and load factors — 702

Environmental Inputs

```
let a = browserapi.application_memoryusage(); 
let b = browserapi.application_memoryusage_limit(); 
let c = browserapi.getCurrentAverageCPUUsage(); // Current CPU utilization percentage on the browser side, measured as a running average over a time interval
let d = browserapi.time_to_first_byte(request_id); // latency for requesting data for the grid from the server
let g = serverapi.getFreeMemory(); // memory available or the server
let h = serverapi.getCurrentAverageCPUUsage(); // Current CPU utilization percentage on the server side, measured as a running average over a time interval
let i = serverapi.getTotalGridBufferStorage(); // amount of server side storage used by already loaded grids
let j = serverapi.getTotalMemory(); // total amount or server memory
let k = serverapi.getNewGridSize(); // amount of server side storage used by new grid(s)
let t = browserapi.getType(); // 'ie', 'chrome', 'ff'
```

Thresholds — 704

```
const threshold_client_memory_safety_limit = 1000 KB; //example
const threshold_server_memory_safety_limit = 3000 KB; //example
const threshold_FFTB_limit_ms = 30000; //30 seconds
const threshold_acceptable_cpu_capability_factor = 70;
const threshold_server_memory_usage_limit = 3000; // 3000 KB
const threshold_acceptable_server_cpu_usage_factor = 50; // 50% cpu usage
```

Load Factor Determinants — 706

```
let client_memory_limit_threshold_exceeded = (b-a) > threshold_client_memory_safety_limit; // true or false - client side only
let FFTB_threshold_exceeded = d > threshold_FFTB_limit_ms; // true or false
let client_side_cpu_capability_exceeded = c > threshold_accepable_cpu_capability_factor;
let server_side_data_size_exceeded = (i + k) > threshold_server_memory_usage_limit;
let server_side_cpu_capability_exceeded = (h > threshold_acceptable_server_cpu_usage_factor);
let server_side_free_memory_exceeded = k > g - threshold_server_memory_safety_limit;
let browser_type_load_factor = ie ? 3 : ff ? 2 : 1; //ie is highest load (slowest), ff is medium, chrome is fastest
```

FIG. 7

Example of client load and server load determination

800

802

```
Client_load = (client_memory_limit_threshold_exceeded ? 2 : 0)   // weight for how close are we to the memory limit
            + (FFTB_threshold_exceeded ? 2 : 0)      // weight for network latency exceeded
            + (client_side_cpu_capability_exceeded ? 1 : 0)  // weight for poor cpu capability
            + (server_side_data_size_exceeded ? 0 : 2)  // weight for server side memory usage of new data
            + (server_side_free_memory_exceeded ? -1 : 1) // weight for too little server side remaining free memory after new grid memory allocated
            + (server_side_cpu_capability_exceeded ? -1 : 1) // weight for cpu usage on the server side
            + browser_type_load_factor;    // weight for browser type
```

804

```
Server_load = (client_memory_limit_threshold_exceeded ? 1 : 0)   // weight for how close are we to the memory limit on client
            + (FFTB_threshold_exceeded ? 1 : 0)  // weight for network latency exceeded
            + (client_side_cpu_capability_exceeded ? 0 : 1)  // weight for poor client cpu capability
            + (server_side_data_size_exceeded ? 2 : 0)  // weight for server side memory usage of new data
            + (server_side_free_memory_exceeded ? 1 : -1)  // weight for too little server side remaining free memory after new grid memory allocated
            + (server_side_cpu_capability_exceeded ? 1 : -1); // weight for cpu usage on the server side
```

FIG. 8

DISTRIBUTION OF COMPONENTS OF DISPLAYED DATA BETWEEN A SERVER AND A CLIENT BASED ON SERVER AND CLIENT LOAD FACTORS

BACKGROUND

1. Field

Embodiments relate to distribution of components of displayed data between a server and a client based on server and client load factors.

2. Background

Client-server computing is a computing model in which one or more client computational devices and at least one server computational device communicate with each other over a network. In client-server computing, a client computational device may initiate contact with the server computational device for making use of shareable resources, applications and/or data managed by the server computational device. The server computational device may receive requests from the one or more client computational resources and may share its resources, applications and/or data with the one or more client computational devices on the network. Resources, applications and data may be distributed among client computational devices and server computational devices.

SUMMARY OF THE PREFERRED EMBODIMENTS

Provided are a method, system, and computer program product in which a determination is made of values for measures that affect processing of data in a computing environment comprising a client communicatively coupled to a server, wherein the measures include data factors, client factors, and server factors. A determination is made as to whether a load on the client is greater than the load on the server by calculating a load on the client and a load on the server based on the data factors, the client factors and the server factors, and then comparing the load on the client to the load on the server. In response to determining that the load on the client is greater than the load on the server, the data is stored at a location in the server, and an indication is made in a data structure in the client of a pointer to the location in the server.

In certain embodiments, in response to determining that the load on the client is not greater than the load on the server, the data is stored in the client.

In further embodiments, the data factors comprise: a count of one or more objects to be transferred; and a size of the one or more objects.

In additional embodiments, the client factors comprise: memory requirements of a client application; a memory usage limit imposed by the client application; a metric measuring central processing unit (CPU) utilization associated with a CPU executing the client application; a metric measuring both server response latency and network communication latency between the client and the server; and an application weighting factor associated with the client application.

In yet additional embodiments, the server factors comprise: a metric measuring available server memory; a metric measuring server CPU utilization; a metric measuring a total amount of server memory associated with client-server data; and a metric measuring a total amount of memory associated with the server.

In further embodiments, the load on the client is based on determining: whether a client memory limit threshold is exceeded; whether a Time to First Byte server and network latency threshold is exceeded; whether a client CPU utilization threshold is exceeded; whether a server data size threshold is exceeded; whether a server free memory threshold is exceeded; whether a server CPU utilization threshold is exceeded; and a client application type weighting factor.

In yet further embodiments, the load on the server is based on determining: whether a client memory limit threshold is exceeded; whether a Time to First Byte server and network latency threshold is exceeded; whether a client CPU utilization threshold is exceeded; whether a server data size threshold is exceeded; whether a server free memory threshold is exceeded; and whether a server CPU utilization threshold is exceeded.

BRIEF DESCRIPTION OF THE DRAWINGS

Referring now to the drawings in which like reference numbers represent corresponding parts throughout:

FIG. 7 illustrates a block diagram that shows an example of inputs, thresholds and load factors, in accordance with certain embodiments;

FIG. 8 illustrates a block diagram that shows an example of client and server load determination, in accordance with certain embodiments;

DETAILED DESCRIPTION

Figure 1:
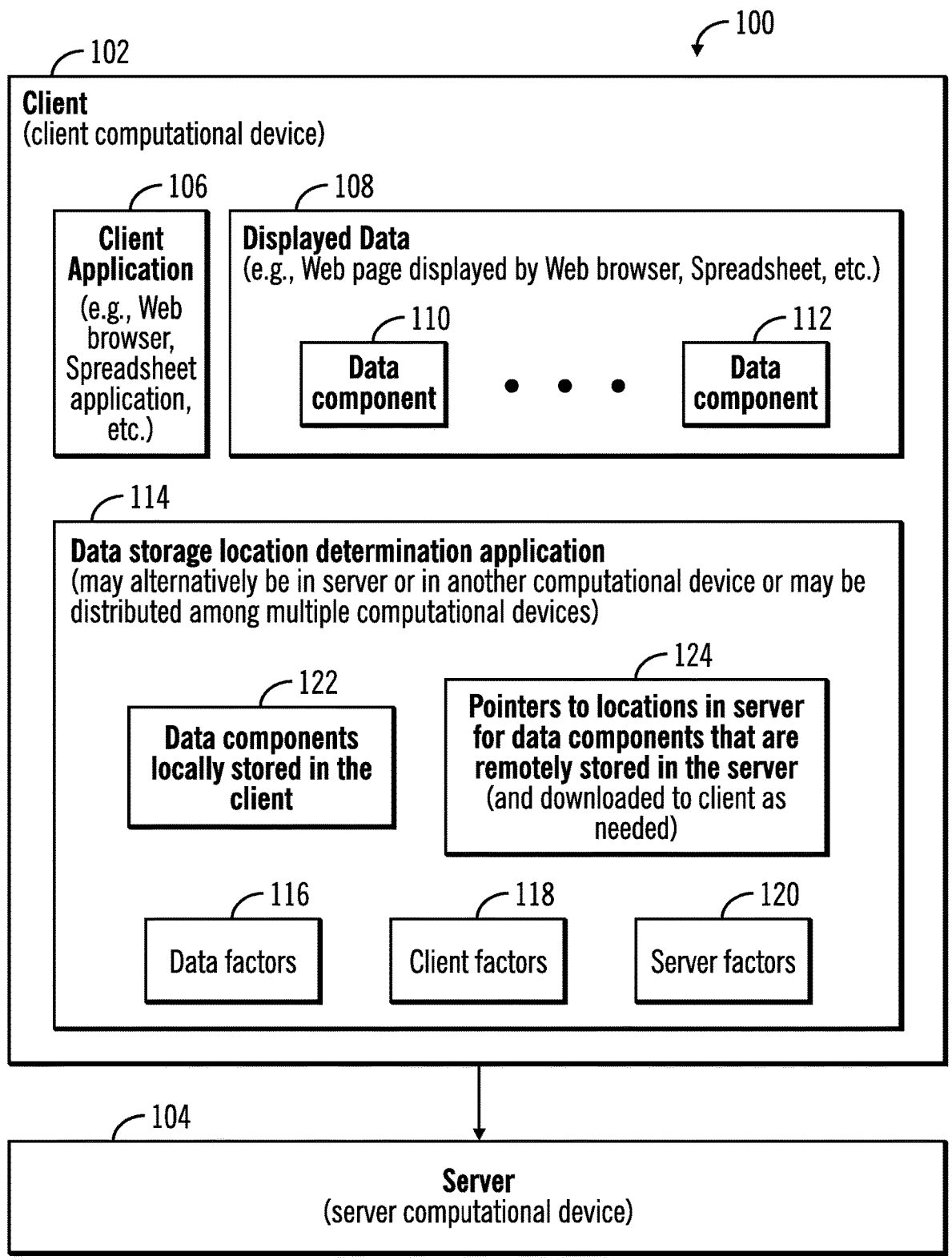
FIG. 1 illustrates a block diagram of a computing environment in which a client computational device is communicatively coupled to a server computational device and data is distributed between the client computational device and the server computational device, in accordance with certain embodiments.

In the following description, reference is made to the accompanying drawings which form a part hereof and which illustrate several embodiments. It is understood that other embodiments may be utilized and structural and operational changes may be made.

A Web application may need to provide a highly responsive experience to a user that is on par with a local desktop-based application with local access to data. Due to the nature of Web applications, both the Web application itself and the data that is displayed by the Web application may have to be loaded over a network. The platform on which the Web application executes may include mobile devices or laptops or desktops, each of varying capability, and the platform may vary from user to user. In order to adapt the behavior of the Web application to the environment in which the Web application is executed, optimizations may be made to the mechanisms by which the Web application stores and loads application data, as well as where the Web application processes that data. Depending on various factors and conditions in the client side browser platform and the server based application platform, the behavior of the Web application in terms of data caching and data processing may need to be modified to provide an optimal user experience. Factors that determine the user experience may include the size and complexity of data to be transferred across the network, the memory usage and processing constraints in the client, the latency involved in responses from client to server and from server to client, and the load and resource constraints in the server.

A paradigm for display of application data via a Web browser may involve the use of a tabular grid data components. LocalGrid and ServerGrid are two types of data grid widgets that may be used in a user interface provided by a Web browser. Both these grids may be backed by a data store that manages the data displayed by the grids. For the LocalGrid, the data store may contain all possible rows of data locally. For the ServerGrid, the data store references data that is stored on a backend server and downloads data to a local Web browser as necessary, based on what needs to be displayed.

In the ServerGrid component the amount of data that may be managed by a LocalGrid data store is limited due to the need to load all of that data to the memory of the Web browser. Therefore, if the amount of data that needs to be viewed is too large for a LocalGrid, using a ServerGrid may be more advantageous and may provide a better user experience. The need to switch the location of the data store may be decided by various run-time factors such as network latency, server latency, and the number of data objects that need to be displayed by the data grid component. Another parameter that could vary is where the data is processed. For instance, activities like sorting and filtering are difficult to perform on the server side if the server is overloaded or difficult to perform on the client side if the client is a low powered mobile device.

Certain embodiments improve the operations of a computing device by providing mechanisms to dynamically switch the location of data storage and data processing for providing improved user experience. In order to determine the optimal location to store and manipulate application data, certain embodiments measure several client-side and server-side variables and combine them to generate relative scores for client load and server load. Certain embodiments then compare the scores to determine whether to store application data on the client or server for optimizing the user experience of loading and displaying the data.

Exemplary Embodiments

FIG. 1 illustrates a block diagram of a computing environment 100 in which a client computational device 102 is communicatively coupled to a server computational device 104 and data is distributed between the client computational device 102 and the server computational device 104, in accordance with certain embodiments. The client computational device 102 may be referred to as a client, and the server computational device 104 may be referred to as a server.

The client 102 and the server 104 may comprise any suitable computational device including those presently known in the art, such as, a personal computer, a workstation, a server, a mainframe, a hand held computer, a palm top computer, a telephony device, a mobile phone, a network appliance, a blade computer, a processing device, a controller, etc.

The client 102 and the server 104 may be elements in any suitable network, such as, a storage area network, a wide area network, the Internet, an intranet, etc. In certain embodiments, the client 102 and the server 104 may be elements in a cloud computing environment.

A client application 106 implemented in software, firmware, hardware or any combination thereof may execute in the client 102. For example, the client application 106 may be a Web browser, a spreadsheet application, etc. Data displayed by the client application 106 is referred to as "displayed data" 108 and may include Web page displayed by a Web browser, spreadsheets with rows and columns, etc.

The displayed data 108 may include a plurality of data components 110, 112. For example, in certain embodiments, data component 110 may be the text of a Web page and data component 112 may be the images of a Web page. In another example, data component 110 may be certain data in a spreadsheet that is rarely updated from the server 104, and data component 112 may be other data in the spreadsheet that is frequently recalculated and updated from the server 104.

A data storage location determination application 114 implemented in software, firmware, hardware or any combination thereof may execute in the client 102. While in FIG. 1, the data storage location determination application 114 has been shown in the client 102, in alternative embodiments the data storage location determination application 114 may be in the server 104, or in some other computational device that is communicatively coupled to the client 102 and the server 104 and/or receives information related to the client 102 and the server 104. In certain embodiments, the operations performed by the data storage location determination application 114 may be implemented via a plurality of applications that are implemented on the client 102 and on the server 104. No matter where the data storage location determination application 114 is located, information related to the client 102 and the server 104 are received by the data storage location application 114 for processing. The data storage location determination application 114 may utilize various data factors 116, client factors 118, and server factors 120 to determine which of the data components 110, 112 to store in the client 102 and which of the data components 110, 112 to store in the server 104. Data is stored remotely in the server 104, if based on the data factors 116, client factors 118, and server factors 120 the load on the client 102 is found to be more than the load on the server 104. Otherwise, the data is stored locally in the client 102.

The data components locally stored on the client 102 are shown via reference numeral 122. The data storage location determination application 114 maintains a data structure 124 that stores pointers to locations in the server 104 for data components that are remotely stored in the server 104.

Therefore, FIG. 1 illustrates certain embodiments in which a data storage location determination application 114 determines client loads and server loads based on data factors 116, client factors 118, and server factors 120, and distributes the storage of data components 110, 112 among the client 102 and the server 104 based on the determined client loads and server loads.

Figure 2:
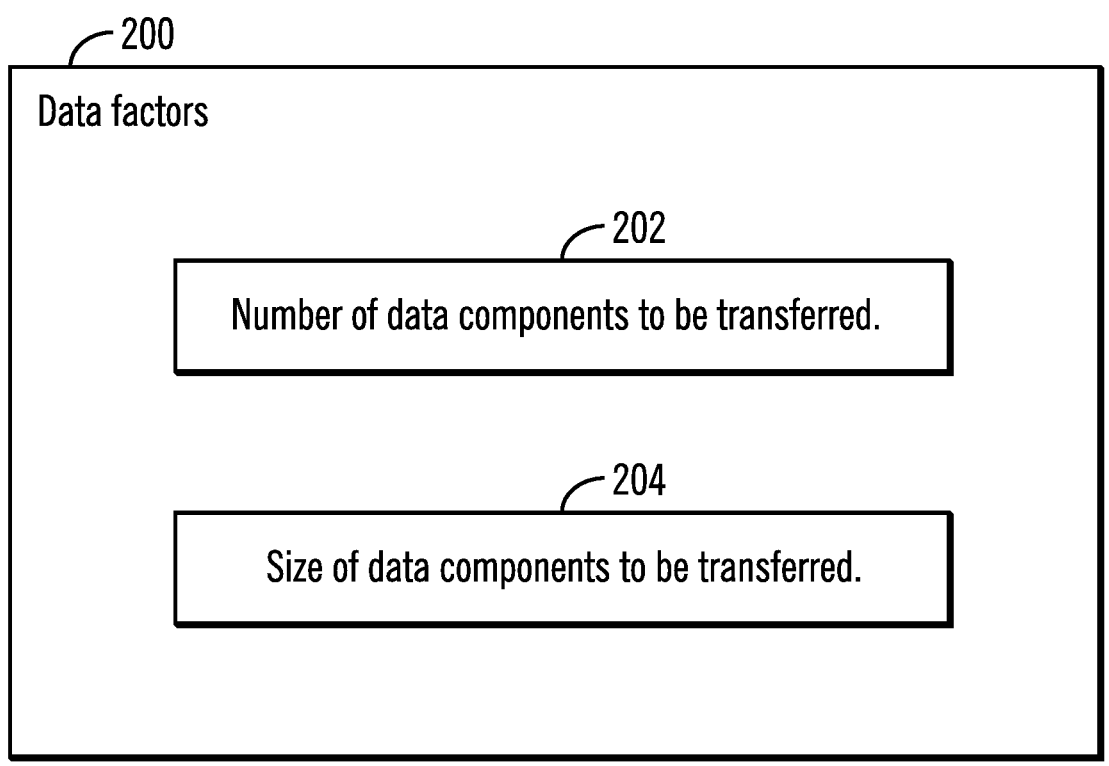
FIG. 2 illustrates a block diagram that shows data factors for distribution of data between the client computational device and the server computational device, in accordance with certain embodiments.

FIG. 2 illustrates a block diagram that shows data factors 200 for distribution of data between the client computational device 102 and the server computational device 104, in accordance with certain embodiments.

In certain embodiments, the data factors 200 may include the number of data components to be transferred between the client 102 and the server 104 (as shown via reference numeral 202) and the size of the data components to be transferred between the client 102 and the server 104 (as shown via reference numeral 204). For example, in certain embodiments, the data factors 200 may include the approximate size in bytes of objects to be transferred to a Web browser in the client 102, and the number of objects to be transferred to the Web browser in the client 102.

Figure 3:
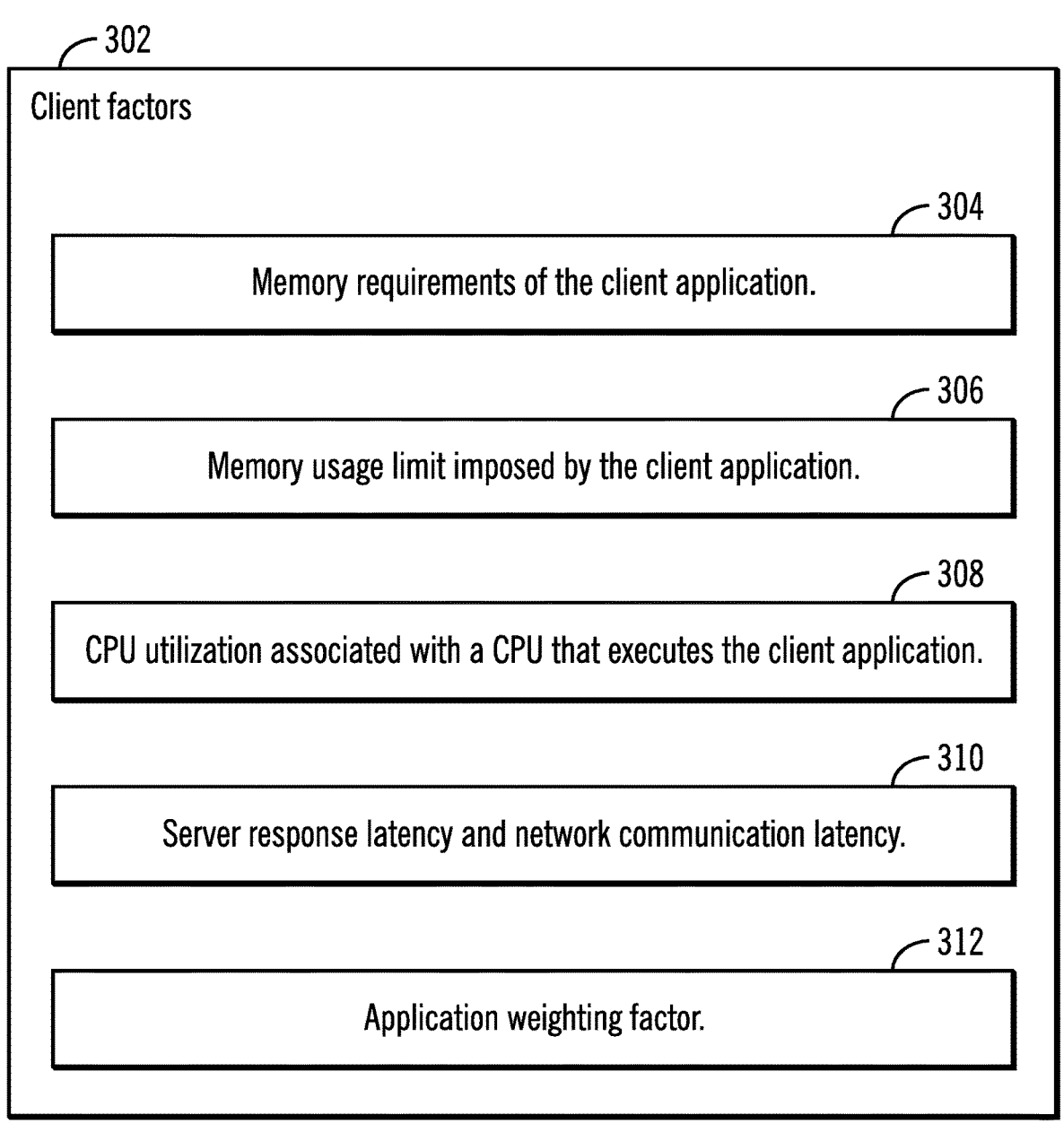
FIG. 3 illustrates a block diagram that shows client factors for distribution of data between the client computational device and the server computational device, in accordance with certain embodiments.

FIG. 3 illustrates a block diagram that shows client factors 302 for distribution of data between the client computational device 102 and the server computational device 104, in accordance with certain embodiments.

In certain embodiments the client factors 302 include the memory requirements of a client application (as shown via reference numeral 304), a memory usage limit imposed by the client application (as shown via reference numeral 306), a metric measuring central processing unit (CPU) utilization associated with a CPU executing the client application (as shown via reference numeral 308), and a metric measuring both server response latency and network communication latency between the client and the server (as shown via reference numeral 310), and an application weighting factor associated with the client application (as shown via reference numeral 312). The application weighting factor 312 may provide different weights to different applications based on application characteristics. For example an application that needs less memory for execution may have different weight that an application that needs more memory for execution.

For example, in certain embodiments the clients factors 302 may include application memory usage a Web browser, an application memory limit imposed by the Web browser that differs greatly for mobile devices versus desktops, a CPU capability of the Web browser platform as provided by a provided by a Web browser Application Programming Interface (API), and a "Time to First Byte" (TTFB) for the response sent by the server 104 to the client 102 that is a measure of network and server latency, where the "Time to First Byte" may represent the time to receive the first byte of data of the response sent by the server 104 to the client 102.

Figure 4:
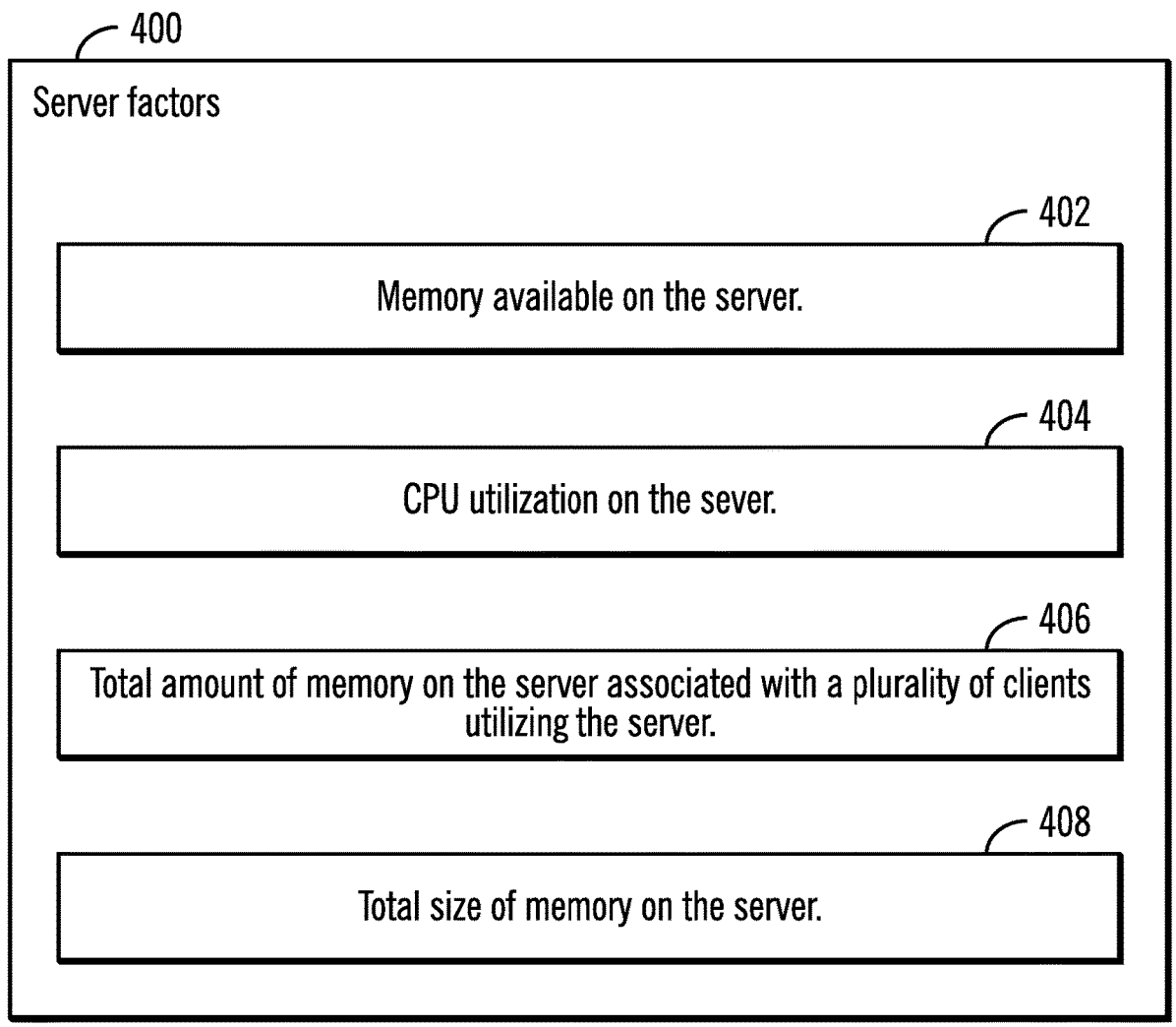
FIG. 4 illustrates a block diagram that shows server factors for distribution of data between the client computational device and the server computational device, in accordance with certain embodiments.

FIG. 4 illustrates a block diagram that shows server factors 400 for distribution of data between the client computational device 102 and the server computational device 104, in accordance with certain embodiments.

In certain embodiments, the server factors 400 comprise a a metric measuring available server memory (as shown via reference numeral 402), a metric measuring server CPU utilization (as shown via reference numeral 404), a metric measuring a total amount of server memory associated with client-server data (e.g., the total amount of memory on the server 104 associated with a plurality of clients utilizing the server 104) [as shown via reference numeral 406], and a metric measuring a total amount of memory associated with the server (as shown via reference numeral 408).

For example, in certain embodiments, the server factors 400 may include the memory available on the server 104, the CPU usage on the server 104, the total size of other grid data buffers (i.e., buffers used for storing data components such as grids) being managed on the server 104, and the total size of memory on the server 104.

Figure 5:
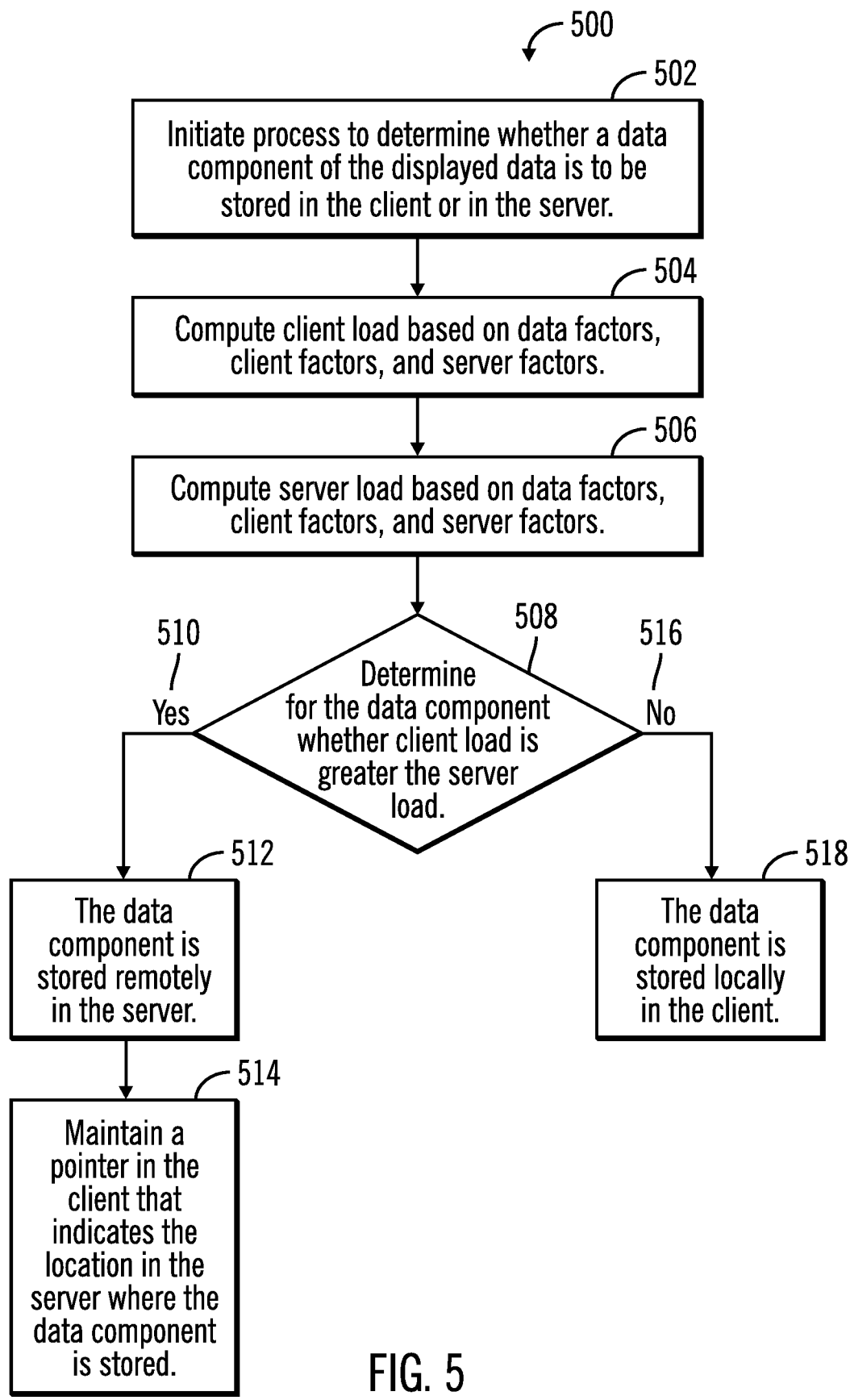
FIG. 5 illustrates a first flowchart that shows how data components are distributed between a client computational device and a server computational device, in accordance with certain embodiments.

FIG. 5 illustrates a first flowchart 500 that shows how data components are distributed between a client computational device 102 and a server computational device 104, in accordance with certain embodiments. In certain embodiments, the operations shown in FIG. 5 may be performed by the data storage location determination application 114 that executes in the client 102.

Control starts at block 502 in which the data storage location determination application 114 initiates a process to determine whether a data component (e.g., data component 110 or data component 112) of the displayed data 108 is to be stored in the client 102 or in the server 104. The data storage location determination application 114 computes the client load (i.e., a measure of how much the client 102 is loaded) based on the data factors 116, the client factors 118, and the server factors 120 (at block 504). The data storage location determination application 114 then computes the server load (i.e., a measure of how much the server 104 is loaded) based on the data factors 116, the client factors 118, and the server factors 120 (at block 506).

From block 506 control proceeds to block 508 in which the data storage location determination application 114 determines for a data component whether the client load is greater than the server load. If so ("Yes" block 510), control proceeds to block 512 in which the data storage location determination application 114 requests the server 104 to store the data component in the server 104 and as a result the data component is stored in the server 104. The data storage location determination application 114 maintains (at block 514) a pointer in the client 102 that indicates the location in the server 104 where the data component is stored.

If at block 508 the data storage location determination application 114 determines that the client load is not greater than the server load ("No" branch 516) control proceeds to block 518 in which the data component is stored locally in the client 102.

Figure 6:
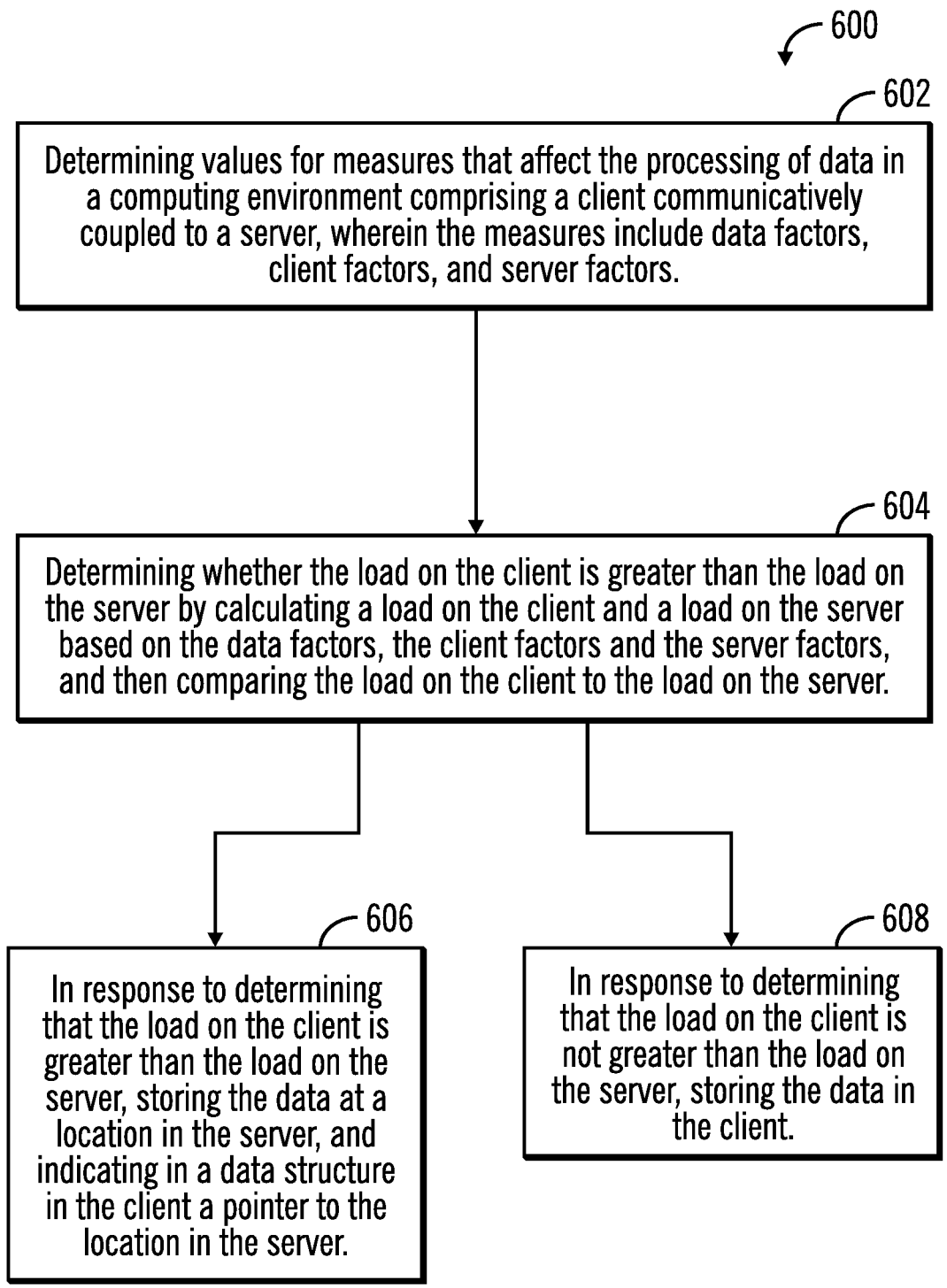
FIG. 6 illustrates a second flowchart that shows how data components are distributed between a client computational device and a server computational device, in accordance with certain embodiments.

FIG. 6 illustrates a second flowchart 600 that shows how data components are distributed between a client computational device and a server computational device, in accordance with certain embodiments. In certain embodiments, the operations shown in FIG. 6 may be performed by the data storage location determination application 114 that executes in the client 102.

Control starts at block 602 in which a determination is made of values for measures that affect processing of data in a computing environment 100 comprising a client 102 communicatively coupled to a server 104, wherein the measures include data factors 116, client factors 118, and server factors 120. A determination is made (at block 604) as to whether a load on the client 102 is greater than the load on the server 104 by calculating a load on the client 102 and a load on the server 104 based on the data factors 116, the client factors 118 and the server factors 120, and then comparing the load on the client 102 to the load on the server 104.

From block 604 control may proceed to block 606 or block 608 depending on whether the load on the client 102 is greater than the load on the server 104.

In response to determining at block 604 that the load on the client 102 is greater than the load on the server 104, control proceeds to block 606 in which the data is stored at a location in the server 104, and an indication is made in a data structure 124 in the client 102 of a pointer to the location in the server 104.

In response to determining at block 604 that the load on the client 102 is not greater than the load on the server 104, control proceeds to block 608 in which the data is stored in the client 102.

FIG. 7 illustrates a block diagram 700 that shows an example of program operations that show environment inputs 702, thresholds 704, and load factor determinants 706, in accordance with certain embodiments. The client application for which the example is provided in FIG. 7 is a Web browser ("referred to as a browser"). In FIG. 7, a programmatic notation has been used to describe the elements.

As shown via reference numeral 702 in FIG. 7, the following variables are initially assigned:
Variable "a" denoting memory usage by the client application;
Variable "b" demoting maximum allowed memory usage by the client application;
Variable "c" denoting current CPU utilization percentage on the browser side, measured as a running average over a time interval;
Variable "d" denoting latency for requesting data for the grid (i.e., data component) from the server;
Variable "g" denoting the memory available on the server;
Variable "h" denoting current CPU utilization percentage on the server side, measured as a running average over a time interval;
Variable "i" denoting the amount of server side storage used by already loaded grids (i.e. data components);
Variable "j" denoting the total amount of server memory;
Variable "k" denoting the amount of server storage used by new grid(s) (i.e. components); and
Variable "t" denoting the type of Web browser.

As shown via reference numeral 704 in FIG. 7, the following thresholds may also be assigned:
threshold_client_memory_safety_limit assigned to 1000 KB (implies that client application should not use more than 1000 KB of memory);
threshold_server_memory_safety_limit assigned to 3000 KB (implies that it is not safe to use more than 3000 KB of server memory);
threshold FFTB limit ms assigned to 30000 which represents 30 seconds (implies that the first byte should be transferred within 30 seconds);
threshold_acceptable_cpu_capability_factor assigned to 70 (implies that a maximum of 70% CPU usage is acceptable on client);
threshold_server_memory_usage_limit=3000 which represent 3000 KB (implies that no more than 3000 KB of server memory should be used); and
threshold_acceptable_server_cpu_usage_factor=50 (implies that at maximum of 50% CPU usage is allowed on server).

The load factor determinants based on the above assignments are shown via reference numeral 706 and are as follows:
(a) client_memory_limit threshold_exceeded is set to true if [(b-a)>threshold_client_memory_safety_limit] otherwise set to false.
(b) FFTB_threshold_exceeded is set to true if [d>threshold FFTB limit ms] otherwise set to false;
(c) client_side_cpu_capability_exceeded is set to true if (c>threshold_acceptable_cpu_capability_factor) otherwise set to false;
(d) server_side_data_size_exceeded is set to true if [(j+k) >threshold_server_memory_usage_limit] otherwise set to false;
(e) server_side_cpu_capability_exceeded is set to true if [h>threshold_acceptable_server_cpu_usage_factor] otherwise set to false;
(f) server_side_free_memory_exceeded is set to true if [k> (g-threshold_server_memory_safety_limit] otherwise set to false; and
(g) browser_type_load_factor is set to 3, 2 or 1 with a higher number representing a browser that has a higher load.

FIG. 8 illustrates a block diagram 800 that shows an example of client and server load determination, in accordance with certain embodiments. In FIG. 8, a form of programmatic notation has been used to describe the elements. In the programmatic notation "x? m:n" evaluates to m if the condition x is true and evaluates to n if the condition x is false.

In certain embodiments the client load (represented by the variable Client_load is calculated as follows:

$$\begin{aligned}\text{Client\_load}=&(\text{client\_memory\_limit threshold\_exceeded?2:0})+(FFTB\_\text{threshold\_exceeded?2:0})+\\&(\text{client\_side\_cpu\_capability\_exceeded?1:0})+\\&(\text{server\_side\_data\_size\_exceeded?0:2})+\\&(\text{server\_side\_free\_memory\_exceeded?-1:1})+\\&(\text{server\_side\_cpu\_capability\_exceeded?-1:1})++\\&\text{browser\_type\_load\_factor}.\end{aligned}$$

In certain embodiments the server load (represented by the variable Server_load is calculated as follows:

$$\begin{aligned}\text{Server\_load}=&(\text{client\_memory\_limit threshold\_exceeded?1:0})+(FFTB\_\text{threshold\_exceeded?1:0})+\\&(\text{client\_side\_cpu\_capability\_exceeded?0:1})+\\&(\text{server\_side\_data\_size\_exceeded?2:0})+\\&(\text{server\_side\_free\_memory\_exceeded?1:-1})+\\&(\text{server\_side\_cpu\_capability\_exceeded?1:-1}).\end{aligned}$$

FIG. 8 shows that the client load increases as the parameters that adversely affect performance on the client get worse and the parameters that adversely affect performance on the server get better, and the server load increases as the parameters that adversely affect performance on the server get worse and the parameters that adversely affect performance on the client get better. Other mechanisms for calculating client load and server load may be used in other embodiments and the factors may be weighted differently.

While FIGS. 1-8 illustrate embodiments in which the client load and the server load are computed based on predetermined thresholds, etc., in alternative embodiments, other mechanisms may be used to arrive at proper values of the thresholds to determine the client load and the server load.

Therefore, FIGS. 1-8 illustrate certain embodiments in which data components are placed in a client or a server based on the relative loading of the client and the server.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
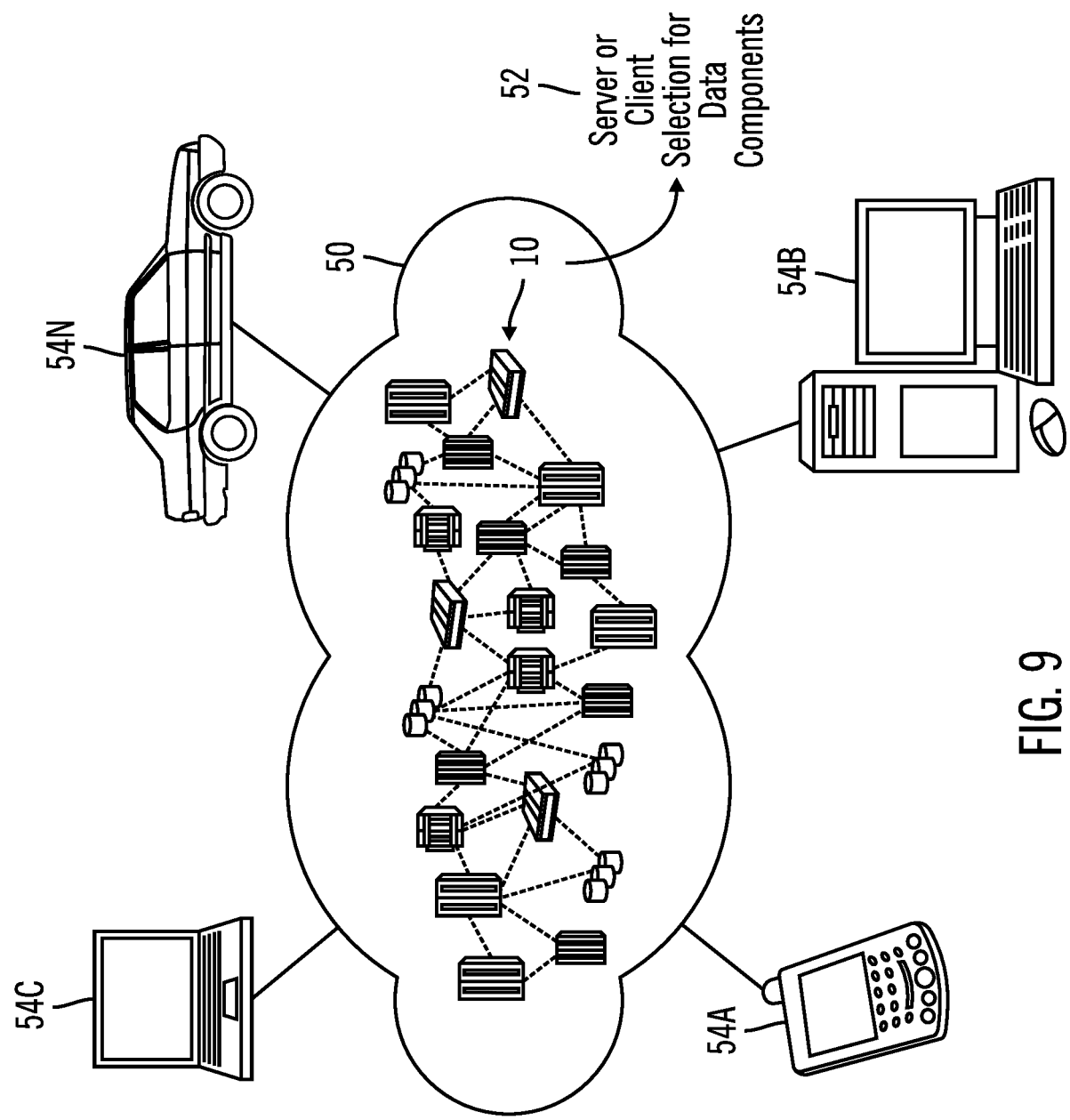
FIG. 9 illustrates a block diagram of a cloud computing environment for implementing the operations described in FIGS. 1-8, in accordance with certain embodiments.

Referring now to FIG. 9 an illustrative cloud computing environment 50 is depicted. Server or client selection for data components (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

Figure 10:
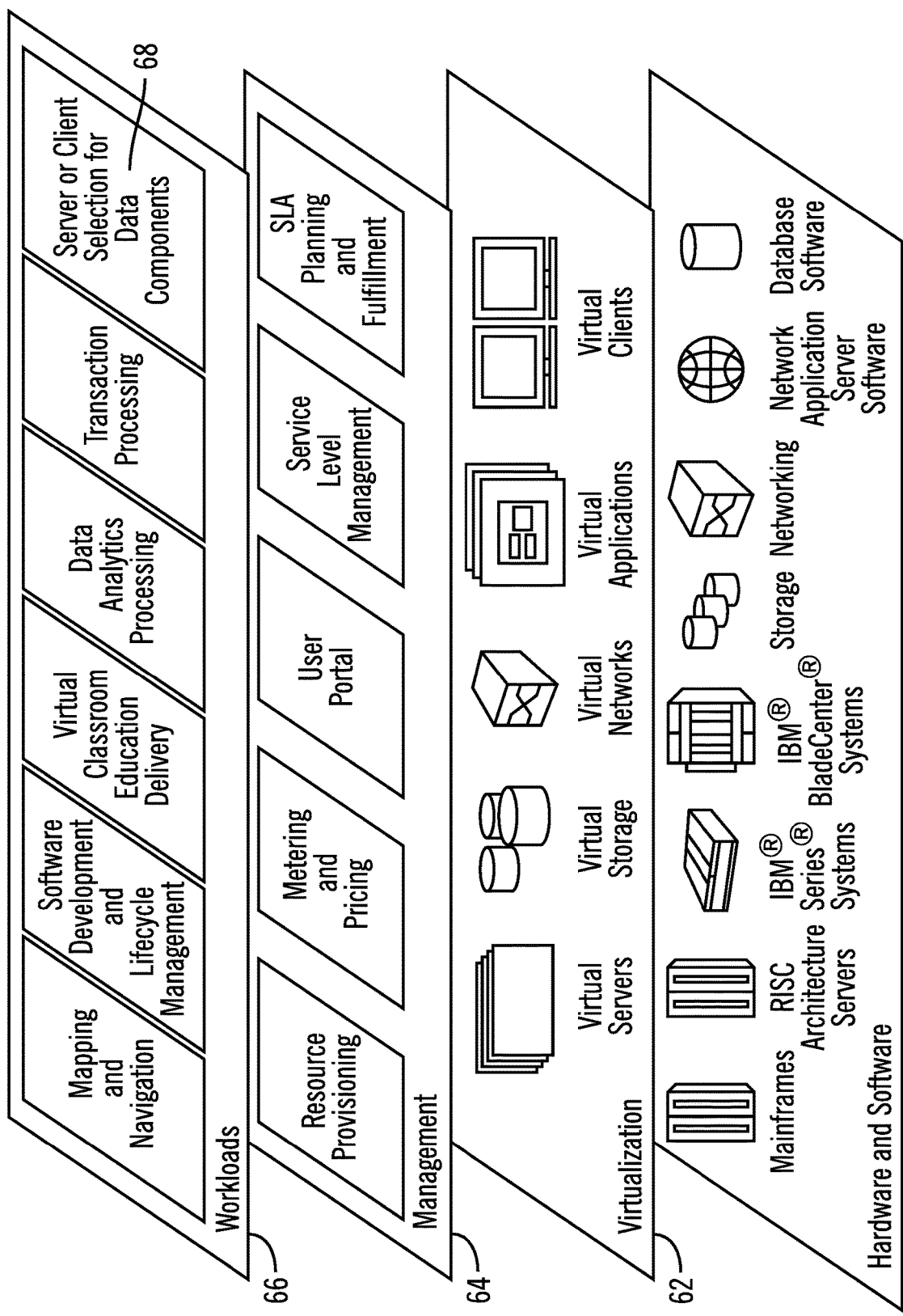
FIG. 10 illustrates a block diagram that shows further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEB SPHERE* application server software; and database software, in one example IBM DB2* database software.

*IBM, ZSERIES, PSERIES, XSERIES, BLADECENTER, WEBSPHERE, AND DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and server and client selection for data components 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
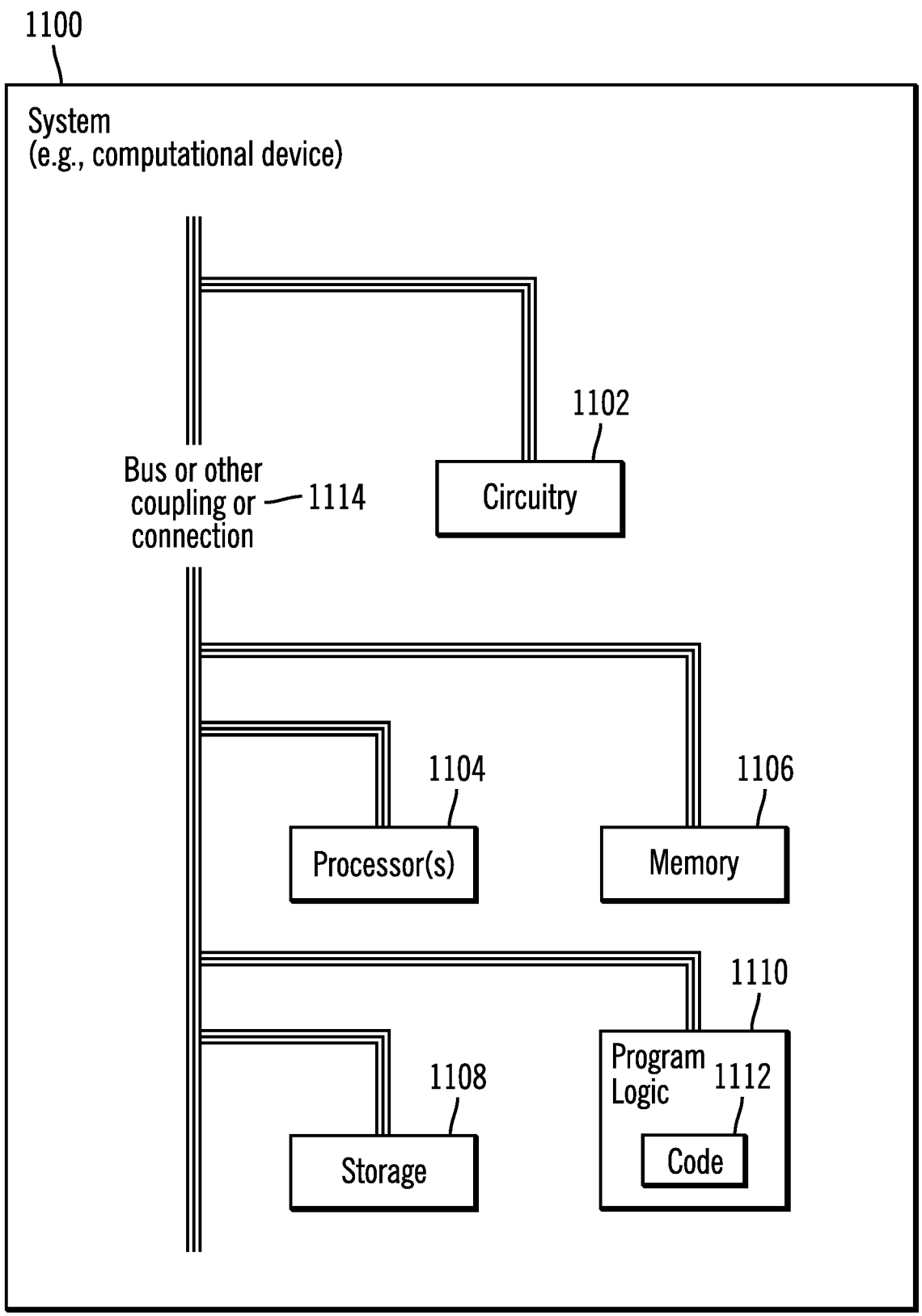
FIG. 11 illustrates a block diagram of a computational system, in accordance with certain embodiments.

FIG. 11 illustrates a block diagram that shows certain elements that may be included in the client 102 or the server 104 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. While FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   determining a values for measures that affect processing of data in a computing environment comprising a client communicatively coupled to a server, wherein the measures include data factors, client factors, and server factors;
   determining whether a load on the client is greater than the load on the server by calculating a load on the client and a load on the server based on the data factors, the client factors and the server factors, and then comparing the load on the client to the load on the server; and
   in response to determining that the load on the client is greater than the load on the server, storing the data at a location in the server, and indicating in a data structure in the client a pointer to the location in the server, wherein:
      the client factors comprise:
      memory requirements of a client application;
      a memory usage limit imposed by the client application;
      a metric measuring central processing unit (CPU) utilization associated with a CPU executing the client application;
      a metric measuring both server response latency and network communication latency between the client and the server; and
      an application weighting factor associated with the client application; and
      the data factors comprise:
      a count of one or more objects to be transferred; and
      a size of the one or more objects.

2. The method of claim 1, wherein the server factors comprise:
   a metric measuring available server memory;
   a metric measuring server CPU utilization;
   a metric measuring a total amount of server memory associated with client-server data; and
   a metric measuring a total amount of memory associated with the server.

3. The method of claim 1, wherein the method is performed by a computational device communicatively coupled to the client and the server.

4. A method, comprising:
   determining a values for measures that affect processing of data in a computing environment comprising a client communicatively coupled to a server, wherein the measures include data factors, client factors, and server factors;
   determining whether a load on the client is greater than the load on the server by calculating a load on the client and a load on the server based on the data factors, the client factors and the server factors, and then comparing the load on the client to the load on the server; and
   in response to determining that the load on the client is greater than the load on the server, storing the data at a location in the server, and indicating in a data structure in the client a pointer to the location in the server, wherein the load on the client is based on determining:
   whether a client memory limit threshold is exceeded;
   whether a Time to First Byte server and network latency threshold is exceeded;
   whether a client CPU utilization threshold is exceeded;
   whether a server data size threshold is exceeded;
   whether a server free memory threshold is exceeded;
   whether a server CPU utilization threshold is exceeded; and
   a client application type weighting factor.

5. The method of claim 4, wherein the data factors comprise:
   a count of one or more objects to be transferred; and
   a size of the one or more objects.

6. The method of claim 4, wherein the method is performed by a computational device communicatively coupled to the client and the server.

7. A method, comprising:
   determining a values for measures that affect processing of data in a computing environment comprising a client communicatively coupled to a server, wherein the measures include data factors, client factors, and server factors;
   determining whether a load on the client is greater than the load on the server by calculating a load on the client and a load on the server based on the data factors, the client factors and the server factors, and then comparing the load on the client to the load on the server; and
   in response to determining that the load on the client is greater than the load on the server, storing the data at a location in the server, and indicating in a data structure in the client a pointer to the location in the server, wherein the load on the server is based on determining:

whether a client memory limit threshold is exceeded;
whether a Time to First Byte server and network latency threshold is exceeded;
whether a client CPU utilization threshold is exceeded;
whether a server data size threshold is exceeded;
whether a server free memory threshold is exceeded; and
whether a server CPU utilization threshold is exceeded.

8. The method of claim 7, wherein the client factors comprise:
   memory requirements of a client application;
   a memory usage limit imposed by the client application;
   a metric measuring central processing unit (CPU) utilization associated with a CPU executing the client application;
   a metric measuring both server response latency and network communication latency between the client and the server; and
   an application weighting factor associated with the client application.

9. The method of claim 7, wherein the method is performed by a computational device communicatively coupled to the client and the server.

10. A system, comprising:
    a memory; and
    a processor coupled to the memory, wherein the processor performs operations, the operations comprising:
      determining values for measures that affect processing of data in a computing environment comprising a client communicatively coupled to a server, wherein the measures include data factors, client factors, and server factors;
      determining whether a load on the client is greater than the load on the server by calculating a load on the client and a load on the server based on the data factors, the client factors and the server factors, and then comparing the load on the client to the load on the server; and
      in response to determining that the load on the client is greater than the load on the server, storing the data at a location in the server, and indicating in a data structure in the client a pointer to the location in the server, wherein:
    the client factors comprise:
      memory requirements of a client application;
      a memory usage limit imposed by the client application;
      a metric measuring central processing unit (CPU) utilization associated with a CPU executing the client application;
      a metric measuring both server response latency and network communication latency between the client and the server; and
      an application weighting factor associated with the client application; and
    the data factors comprise:
      a count of one or more objects to be transferred; and
      a size of the one or more objects.

11. The system of claim 10, wherein the server factors comprise:
    a metric measuring available server memory;
    a metric measuring server CPU utilization;
    a metric measuring a total amount of server memory associated with client-server data; and
    a metric measuring a total amount of memory associated with the server.

12. A system, comprising:
    a memory; and
    a processor coupled to the memory, wherein the processor performs operations, the operations comprising:
      determining values for measures that affect processing of data in a computing environment comprising a client communicatively coupled to a server, wherein the measures include data factors, client factors, and server factors;
      determining whether a load on the client is greater than the load on the server by calculating a load on the client and a load on the server based on the data factors, the client factors and the server factors, and then comparing the load on the client to the load on the server; and
      in response to determining that the load on the client is greater than the load on the server, storing the data at a location in the server, and indicating in a data structure in the client a pointer to the location in the server, wherein the load on the client is based on determining:
    whether a client memory limit threshold is exceeded;
    whether a Time to First Byte server and network latency threshold is exceeded;
    whether a client CPU utilization threshold is exceeded;
    whether a server data size threshold is exceeded;
    whether a server free memory threshold is exceeded;
    whether a server CPU utilization threshold is exceeded; and
    a client application type weighting factor.

13. The system of claim 12, wherein the data factors comprise:
    a count of one or more objects to be transferred; and
    a size of the one or more objects.

14. A system, comprising:
    a memory; and
    a processor coupled to the memory, wherein the processor performs operations, the operations comprising:
      determining values for measures that affect processing of data in a computing environment comprising a client communicatively coupled to a server, wherein the measures include data factors, client factors, and server factors;
      determining whether a load on the client is greater than the load on the server by calculating a load on the client and a load on the server based on the data factors, the client factors and the server factors, and then comparing the load on the client to the load on the server; and
      in response to determining that the load on the client is greater than the load on the server, storing the data at a location in the server, and indicating in a data structure in the client a pointer to the location in the server, wherein the load on the server is based on determining:
    whether a client memory limit threshold is exceeded;
    whether a Time to First Byte server and network latency threshold is exceeded;
    whether a client CPU utilization threshold is exceeded;
    whether a server data size threshold is exceeded;
    whether a server free memory threshold is exceeded; and
    whether a server CPU utilization threshold is exceeded.

15. The system of claim 14, wherein the client factors comprise:
    memory requirements of a client application;
    a memory usage limit imposed by the client application;
    a metric measuring central processing unit (CPU) utilization associated with a CPU executing the client application;

a metric measuring both server response latency and network communication latency between the client and the server; and an application weighting factor associated with the client application.

16. A computer program product, the computer program product comprising a computer readable storage medium having computer readable program code embodied therewith, the computer readable program code configured to perform operations, the operations comprising:

determining values for measures that affect processing of data in a computing environment comprising a client communicatively coupled to a server, wherein the measures include data factors, client factors, and server factors;

determining whether a load on the client is greater than the load on the server by calculating a load on the client and a load on the server based on the data factors, the client factors and the server factors, and then comparing the load on the client to the load on the server; and in response to determining that the load on the client is greater than the load on the server, storing the data at a location in the server, and indicating in a data structure in the client a pointer to the location in the server, wherein:

the client factors comprise:
memory requirements of a client application;
a memory usage limit imposed by the client application;
a metric measuring central processing unit (CPU) utilization associated with a CPU executing the client application;
a metric measuring both server response latency and network communication latency between the client and the server; and
an application weighting factor associated with the client application; and the data factors comprise:
a count of one or more objects to be transferred; and
a size of the one or more objects.

17. The computer program product of claim 16, wherein the server factors comprise:
a metric measuring available server memory;
a metric measuring server CPU utilization;
a metric measuring a total amount of server memory associated with client-server data; and
a metric measuring a total amount of memory associated with the server.

18. A computer program product, the computer program product comprising a computer readable storage medium having computer readable program code embodied therewith, the computer readable program code configured to perform operations, the operations comprising:

determining values for measures that affect processing of data in a computing environment comprising a client communicatively coupled to a server, wherein the measures include data factors, client factors, and server factors;

determining whether a load on the client is greater than the load on the server by calculating a load on the client and a load on the server based on the data factors, the client factors and the server factors, and then comparing the load on the client to the load on the server; and in response to determining that the load on the client is greater than the load on the server, storing the data at a location in the server, and indicating in a data structure in the client a pointer to the location in the server, wherein the load on the client is based on determining:
whether a client memory limit threshold is exceeded;
whether a Time to First Byte server and network latency threshold is exceeded;
whether a client CPU utilization threshold is exceeded;
whether a server data size threshold is exceeded;
whether a server free memory threshold is exceeded;
whether a server CPU utilization threshold is exceeded; and
a client application type weighting factor.

19. The computer program product of claim 18, wherein the data factors comprise:
a count of one or more objects to be transferred; and
a size of the one or more objects.

20. A computer program product, the computer program product comprising a computer readable storage medium having computer readable program code embodied therewith, the computer readable program code configured to perform operations, the operations comprising:

determining values for measures that affect processing of data in a computing environment comprising a client communicatively coupled to a server, wherein the measures include data factors, client factors, and server factors;

determining whether a load on the client is greater than the load on the server by calculating a load on the client and a load on the server based on the data factors, the client factors and the server factors, and then comparing the load on the client to the load on the server; and in response to determining that the load on the client is greater than the load on the server, storing the data at a location in the server, and indicating in a data structure in the client a pointer to the location in the server, wherein the load on the server is based on determining:
whether a client memory limit threshold is exceeded;
whether a Time to First Byte server and network latency threshold is exceeded;
whether a client CPU utilization threshold is exceeded;
whether a server data size threshold is exceeded;
whether a server free memory threshold is exceeded; and
whether a server CPU utilization threshold is exceeded.

21. The computer program product of claim 20, wherein the client factors comprise:
memory requirements of a client application;
a memory usage limit imposed by the client application;
a metric measuring central processing unit (CPU) utilization associated with a CPU executing the client application;
a metric measuring both server response latency and network communication latency between the client and the server; and
an application weighting factor associated with the client application.

* * * * *